United States Patent
Salter et al.

(10) Patent No.: US 10,442,429 B2
(45) Date of Patent: Oct. 15, 2019

(54) WRONG-WAY VEHICLE DETECTION

(71) Applicant: Ford Global Technologies, LLC, Dearborn, MI (US)

(72) Inventors: Stuart C. Salter, White Lake, MI (US); Paul Kenneth Dellock, Northville, MI (US); Cornel Lewis Gardner, Romulus, MI (US); Pietro Buttolo, Dearborn Heights, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/474,505

(22) Filed: Mar. 30, 2017

(65) Prior Publication Data

US 2018/0281782 A1 Oct. 4, 2018

(51) Int. Cl.
| | |
|---|---|
| *B60R 22/00* | (2006.01) |
| *B60W 30/09* | (2012.01) |
| *B60W 10/18* | (2012.01) |
| *B60W 10/30* | (2006.01) |
| *G08G 1/056* | (2006.01) |
| *B60W 40/10* | (2012.01) |
| *B60W 50/14* | (2012.01) |
| *G01C 21/36* | (2006.01) |

(Continued)

(52) U.S. Cl.
CPC ............ *B60W 30/09* (2013.01); *B60Q 1/525* (2013.01); *B60W 10/18* (2013.01); *B60W 10/30* (2013.01); *B60W 40/10* (2013.01); *B60W 50/14* (2013.01); *G01C 21/3697* (2013.01); *G08G 1/056* (2013.01); *G08G 1/166* (2013.01); *B60W 2420/42* (2013.01); *B60W 2420/52* (2013.01); *B60W 2550/20* (2013.01); *B60W 2710/18* (2013.01); *B60W 2710/30* (2013.01); *B60W 2720/10* (2013.01); *G01S 19/42* (2013.01)

(58) Field of Classification Search
CPC ........ B60W 30/09; B60W 10/18; B60Q 1/525
See application file for complete search history.

(56) References Cited

U.S. PATENT DOCUMENTS 7,755,475 B2 * 7/2010 Toelge ................... B60Q 1/444
188/1.11 E
9,024,787 B2 * 5/2015 Alshinnawi ...... G08G 1/096783
340/928

(Continued)

FOREIGN PATENT DOCUMENTS

DE 3305555 A1 9/1984
DE 102010028122 A1 10/2011

(Continued)

OTHER PUBLICATIONS

Search Report from United Kingdom Intellectual Property Office dated Sep. 6, 2018 regarding Application No. GB1805013.8 (4 pages).

*Primary Examiner* — Adam M Alharbi
(74) *Attorney, Agent, or Firm* — Frank A. MacKenzie; Bejin Bieneman PLC

(57) ABSTRACT

Disclosed herein is a system including a computer programmed to determine that a vehicle is traveling in a wrong-way direction. Upon such determination, the computer is programmed to actuate a light of the vehicle to provide a user-detectable pattern external to the vehicle.

20 Claims, 3 Drawing Sheets

(51) Int. Cl.
 *B60Q 1/52* (2006.01)
 *G08G 1/16* (2006.01)
 *G01S 19/42* (2010.01)

(56) References Cited

U.S. PATENT DOCUMENTS

| | | |
|---|---|---|
| 2015/0127190 A1 | 5/2015 | Fuehrer |
| 2015/0360610 A1 | 12/2015 | Reed et al. |
| 2016/0217687 A1 | 7/2016 | Rous et al. |
| 2016/0343253 A1 | 11/2016 | Imai |
| 2017/0018178 A1 | 1/2017 | Poechmueller et al. |
| 2017/0160743 A1* | 6/2017 | Schweikl .............. G05D 1/0088 |

FOREIGN PATENT DOCUMENTS

| | | |
|---|---|---|
| DE | 102013007001 A1 | 10/2014 |
| EP | 1840860 A1 | 3/2007 |
| GB | 2485652 A | 5/2012 |
| KR | 970010187 B1 | 6/1997 |
| WO | 2017149655 A1 | 9/2017 |

\* cited by examiner

WRONG-WAY VEHICLE DETECTION

BACKGROUND

Lanes on roadways for vehicle travel typically have a designated direction of travel. A vehicle traveling in a direction that is other the designated direction of travel, i.e., a wrong-way, may be dangerous to the vehicle, other vehicles, pedestrians, and/or objects. However, a human operator of a vehicle may not recognize when the vehicle is traveling the wrong way on a roadway, or the vehicle may not have a human operator, or even a human occupant.

DETAILED DESCRIPTION

Introduction

Figure 1:
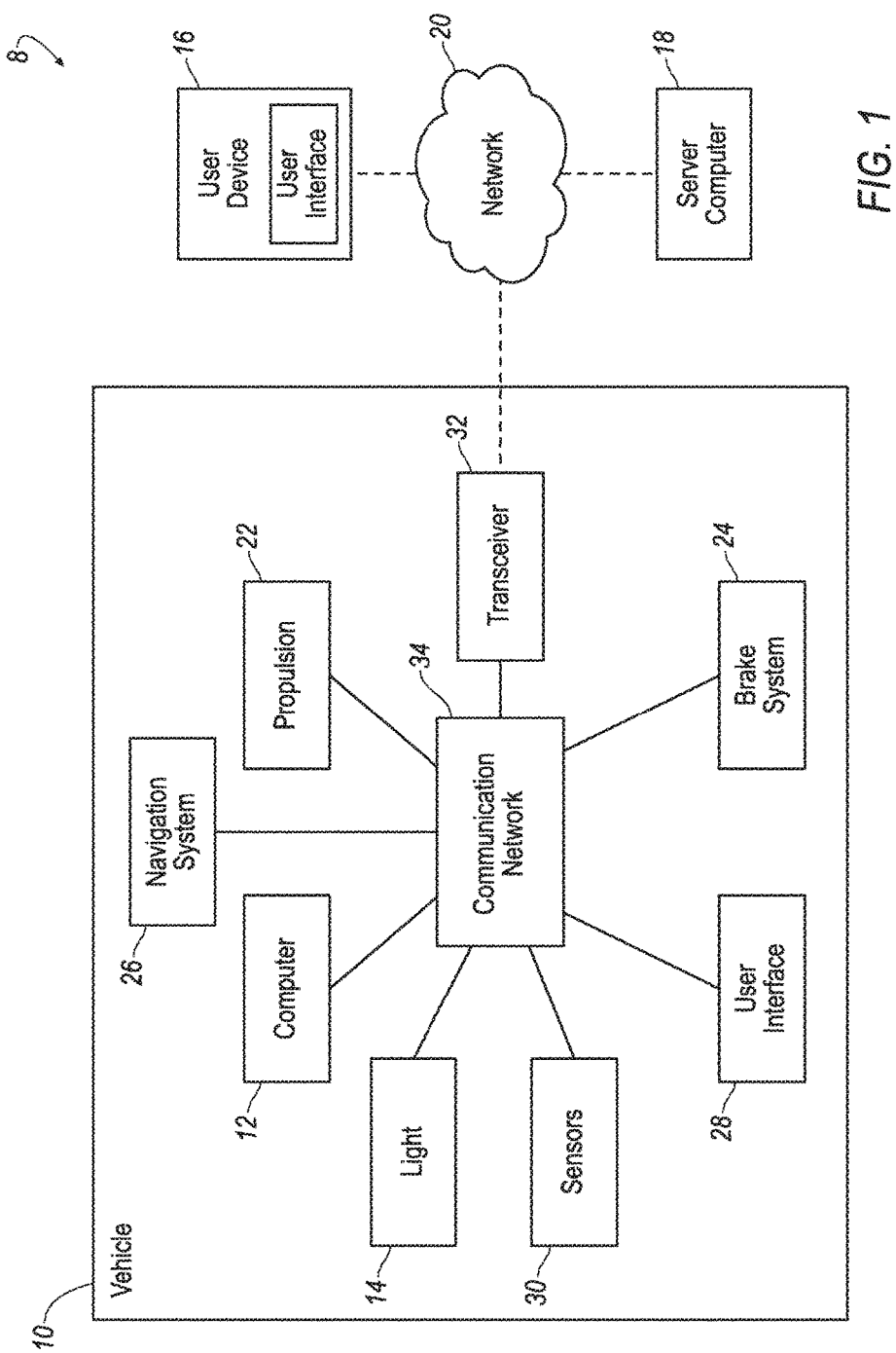
FIG. 1 is a block diagram of components of an example vehicle wrong-way alert system.

Disclosed herein is a method comprising actuating a light of a first vehicle to provide a user-detectable pattern external to the first vehicle upon determination that the first vehicle is traveling in a wrong-way direction. Determining that the vehicle is traveling in the wrong-way direction may be based on information received from a navigation system. The navigation system may be a global positioning system.

The method may further comprise actuating the light between a first brightness level and a second brightness level to provide the user-detectable pattern. Determining one of the first brightness level and the second brightness level may be based on a distance between the first vehicle and a second vehicle.

The method may further comprise actuating the light between an on state and an off state to provide the user-detectable pattern.

The method may further comprise actuating the light to provide the user-detectable pattern at a rate based on a speed of the first vehicle.

The method may further comprise actuating the light to provide the user-detectable pattern at a rate that does not exceed 60 hertz.

The method may further comprise actuating the light to provide the user-detectable pattern upon determination that a location of the first vehicle is a restricted location.

The method may further comprise actuating one and only one of a driver side headlight and a passenger side headlight to provide the user-detectable pattern.

The method may further comprise limiting a speed of the first vehicle to a first amount upon the determination that the first vehicle is traveling in the wrong-way direction. The method may further limit the speed of the first vehicle to a second amount upon determination that the first vehicle has traveled in the wrong-way direction for a threshold amount of time.

The method may further comprise terminating actuation of the light upon determination that the first vehicle is no longer traveling in the wrong-way direction.

Also disclosed herein is a computer having a processor and memory programmed to perform some or all of the disclosed method. Also disclosed is a computer-readable medium storing computer-executable instructions to perform some or all of the disclosed method.

Also disclosed herein is a system comprising a computer programmed to actuate a light of a first vehicle to provide a user-detectable pattern external to the first vehicle upon determination that the first vehicle is traveling in a wrong-way direction.

The computer may be further programmed to actuate the light between a first brightness level and a second brightness level to provide the user-detectable pattern.

The computer may be further programmed to determine one of the first brightness level and the second brightness level based on a distance between the first vehicle and a second vehicle.

The computer may be further programmed to actuate the light between an on state and an off state to provide the user-detectable pattern.

The computer may be further programmed to actuate the light to provide the user-detectable pattern at a rate based on a speed of the first vehicle.

The computer may be further programmed to actuate the light to provide the user-detectable pattern at a rate that does not exceed 60 hertz.

The computer may be further programmed to actuate the light to provide the user-detectable pattern upon determination that a location of the first vehicle is a restricted location.

The computer may be further programmed to actuate one and only one of a driver side headlight and a passenger side headlight to provide the user-detectable pattern.

The computer may be further programmed to limit a speed of the first vehicle to a first amount upon the determination that the first vehicle is traveling in the wrong-way direction.

The computer may be further programmed to limit the speed of the first vehicle to a second amount upon determination that the first vehicle has traveled in the wrong-way direction for a threshold amount of time.

With reference to FIG. 1 wherein like numerals indicate like parts throughout the several views, a system 8 provides a solution to the problem of detecting vehicles traveling a wrong way on a roadway. The system 8 includes a vehicle 10 that in turn includes a computer 12 programmed to detect that the vehicle 10 is travelling a wrong way on a roadway. The computer 12 can actuate a light 14 of the vehicle 10 to provide a user-detectable pattern external to the vehicle 10 upon determining that the vehicle 10 is traveling in a wrong-way direction. The vehicle 10 may communicate with a user device 16 and a server computer 18, e.g., directly and/or via a network 20.

As used herein "wrong-way" refers to traveling in a direction that is other than a designated direction of travel for a vehicle lane.

As used herein, the term "user-detectable pattern" is a pattern of light actuation that is detectable by a human person outside of the vehicle 10 but within a threshold distance of the vehicle 10, e.g. 100 yards, without the aid of mechanized enhancements, e.g., light sensors, cameras, etc., i.e., the user-detectable pattern is detectable by an average naked human eye.

In the following description, relative orientations and directions (by way of example, left, right) are from the perspective of an occupant seated in a driver seat and facing a dashboard of the vehicle 10.

The System

The network 20 (sometimes referred to as a wide area network because it can include communications between devices that are geographically remote, i.e., not in a same building, vehicle, etc., from one another) represents one or more mechanisms by which remote devices may communicate with each other, e.g., the server computer 18, the vehicle 10, the user device 16 and/or other computing devices. Accordingly, the network 20 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server computer 18 is a computing device that includes hardware, e.g. circuits, chips, antenna, etc., programmed to transmit, receive, and process information, to and from the vehicle 10, user devices 16, other server computers, etc., e.g., via the network 20. The server computer 18 may be one or more computers, each generally including at least one processor and at least one memory, implemented as described herein, the memory storing instructions executable by the processor, including instructions for carrying out various steps and processes described herein. The server computer 18 may include or be communicatively coupled to a data store for storing collected data, lookup tables, a virtual map, etc.

The user device 16 may be any one of a variety of computing devices implemented via circuits, chips, antenna, or other electronic components, and is typically a portable or wearable user device, e.g., a smartphone, a tablet, a personal digital assistant, etc. The user device includes a user interface that presents information to and receives information from a user of the user device 16. The user interface may include a touch-sensitive display screen, speakers, microphone, etc. The user device 16 may communicate with the vehicle computer 12, the server computer 18, etc., directly and/or indirectly, e.g., via the network 20.

The vehicle 10 may include any passenger or commercial automobile such as a car, a truck, a sport utility vehicle, a crossover vehicle, a van, a minivan, a taxi, a bus, etc. In some possible approaches, the vehicle 10 is an autonomous vehicle that can operate in an autonomous (e.g., driverless) mode, a partially autonomous mode, and/or a non-autonomous mode. The vehicle 10 may include the light 14, a propulsion 22, a brake system 24, a navigation system 26, a user interface 28, sensors 30, a transceiver 32, a communication network 34, and the vehicle computer 12.

The light 14 includes a light producing structure that converts electricity into visible light, such as a tungsten filament, a metal-halide lamp, a light emitting diode etc. The light 14 includes various circuits, chips, wiring, or other electronic components to provide control of a brightness of the light 14, e.g., in response to a command received via the communication network 34, and/or a change in power supplied to the light 14, e.g., a change in voltage. The light 14 may be enclosed, e.g., within a housing including a reflector and a lens. Example lights 14 include headlights, turn signals, etc. The light 14 may be located on a specific side of the vehicle 10, e.g., a driver side headlight 14*d* and a passenger side headlight 14*p*. As used herein "driver side" is a side of the vehicle 10 at which a driver sits, e.g., a right side for typical vehicles manufactured in the United States. "Passenger side" is a side opposite the driver side, e.g., a left side for typical vehicles manufactured in the United States.

The propulsion 22 of the vehicle translates stored energy into motion of the vehicle 10. The propulsion 22 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 22 is in communication with and receives input from the computer 12 and from a human driver. The human driver may control the propulsion 22 via, e.g., an accelerator pedal and/or a gear-shift lever.

The brake system 24 can be a known vehicle braking subsystem that resists the motion of the vehicle 10 to thereby slow and/or stop the vehicle 10. The brake system 24 may be friction brakes such as disc brakes, drum brakes, band brakes, etc.; regenerative brakes; any other suitable type of brakes; or a combination. The brake system 24 can include an electronic control unit (ECU) or the like that actuates the brake system 24 to resist the motion of the vehicle 10, e.g., in response to a command from the computer 12 and/or from a human driver. The human driver may control the brake system 24 via, e.g., a brake pedal.

The navigation system 26 is implemented via circuits, chips, or other electronic components that can determine a present location of the vehicle 10. The navigation system 26 may be implemented via a satellite-based system such as the Global Positioning System (GPS). The navigation system 26 may triangulate the location of the vehicle 10 based on signals received from various satellites in the Earth's orbit. The navigation system 26 is programmed to output signals representing the present location of the vehicle 10 to, e.g., to the computer 12 via the communication network 34. In some instances, the navigation system 26 is programmed to determine a route from the present location to a future location, including developing alternative routes, e.g., if a road is closed. The navigation system 26 may access a virtual map stored in the memory of the vehicle 10 (discussed below), locally in the navigation system 26, in the server computer 18, etc., and develop the route according to the virtual map. The virtual map may include lanes of travel, speed limits for such lanes, and a designated direction of travel in the lanes, for various roads, highways, alleys, thoroughfares, etc.

The user interface 28 presents information to and receives information from an occupant of the vehicle 10. The user interface 28 may be located, e.g., on an instrument panel in a passenger cabin of the vehicle, or wherever may be readily seen by the occupant. The user interface 28 may include dials, digital readouts, screens such as a touch-sensitive display screen, speakers, and so on for providing information to the occupant, e.g., human-machine interface (HMI) elements. The user interface 28 may include buttons, knobs, keypads, microphone, and so on for receiving information from the occupant.

The sensors 30 may detect internal states of the vehicle 10, for example, wheel speed, wheel orientation, and engine and transmission variables. The sensors 30 may detect the position or orientation of the vehicle 10, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 30 may detect the external world, for example, radar sensors, scanning laser range finders, light detection and ranging (LIDAR) devices, and image processing sensors such as cameras. The sensors 30 may include communications devices, for example, vehicle-to-infrastructure (V2I) or vehicle-to-vehicle (V2V) devices.

The transceiver 32 transmits and receives information wirelessly from other transceivers, either directly or via the network 20, enabling signals, data and other information to be exchanged with other computer and network systems, e.g., the server computer 18, the user device 16, etc. The transceiver 32 is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers.

The communication network 34 includes hardware, such as a communication bus, for facilitating communication among vehicle components. The communication network 34 may facilitate wired or wireless communication among the vehicle components in accordance with a number of communication protocols such as controller area network (CAN), Ethernet, WiFi, Local Interconnect Network (LIN), and/or other wired or wireless mechanisms.

The vehicle computer 12, implemented via circuits, chips, or other electronic components, is included in the vehicle 10 for carrying out various operations and processes, including as described herein. The vehicle computer 12 is a computing device that generally includes a processor and a memory, the memory including one or more forms of computer-readable media, and storing instructions executable by the processor for performing various operations, including as disclosed herein. The memory of the vehicle computer 12 further generally stores remote data received via various communications mechanisms; e.g., the vehicle computer 12 is generally configured for communications on a controller area network (CAN) bus or the like, and/or for using other wired or wireless protocols, e.g., Bluetooth, etc. Via the communication network 34 using Ethernet, WiFi, the CAN bus, Local Interconnect Network (LIN), and/or other wired or wireless mechanisms, the vehicle computer 12 may transmit messages to various devices in the vehicle 10 and/or receive messages from the various devices, e.g., controllers, actuators, sensors, etc., e.g., controllers and sensors as discussed herein. For example, the vehicle computer 12 may receive data from vehicle sensors 30. Although one vehicle computer 12 is shown in FIG. 1 for ease of illustration, it is to be understood that the vehicle computer 12 could include, and various operations described herein could be carried out by, one or more computing devices.

The vehicle computer 12 is programmed to actuate one or more vehicle 10 lights 14 to provide the user-detectable pattern external to the vehicle 10 upon determination that the vehicle 10 is traveling in the wrong-way direction.

The computer 12 may determine that the vehicle 10 is traveling is the wrong-way direction based on information received from the navigation system 26, information received from sensors 30, information received via the transceiver 32, etc., including combinations thereof. For example, information from the navigation system 26 may indicate that the vehicle 10 is traveling in a direction other than, e.g., opposite to, the designated direction of travel for a lane in which the vehicle 10 is located, e.g., based on a comparison of the location and direction of travel of the vehicle 10, e.g., as determined by the navigation system 26, with the virtual map including the designated direction of travel, e.g., stored in the navigation system 26. Information from the sensors 30 may indicate the vehicle 10 is traveling in the wrong-way direction, e.g., information received by the computer 12 from a camera may be analyzed, e.g., using known techniques to identify indicators in captured images from the camera, e.g., a back side of a street sign, an orientation of parked vehicles along a side of the road, etc. Information received via the transceiver 32 may include information indicating the vehicle 10 is traveling the wrong-way, e.g., information transmitted from a street side speed radar sensor, intersection camera and controller, other vehicle 10, etc., e.g., transmitted via the network 20.

The computer 12 may actuate the light 14 to provide the user-detectable pattern by sending a command to the light 14, e.g., via the communication network 34, instructing such actuation. The computer 12 may actuate the light 14 by controlling a flow electricity provided to the light 14, including the characteristics of such electricity, e.g., the voltage (actual and/or apparent) provided, e.g., where a higher voltage produces a brighter light.

The computer 12 may actuate the light 14 between a first brightness level, e.g., 700 lumen, and a second brightness level, e.g., 800 lumen, to provide the user-detectable pattern. The variation between the first and second brightness level is sufficient to be detected by the person external of the vehicle 10, e.g., at least a 10% variation between the first and second brightness levels.

Figure 2:
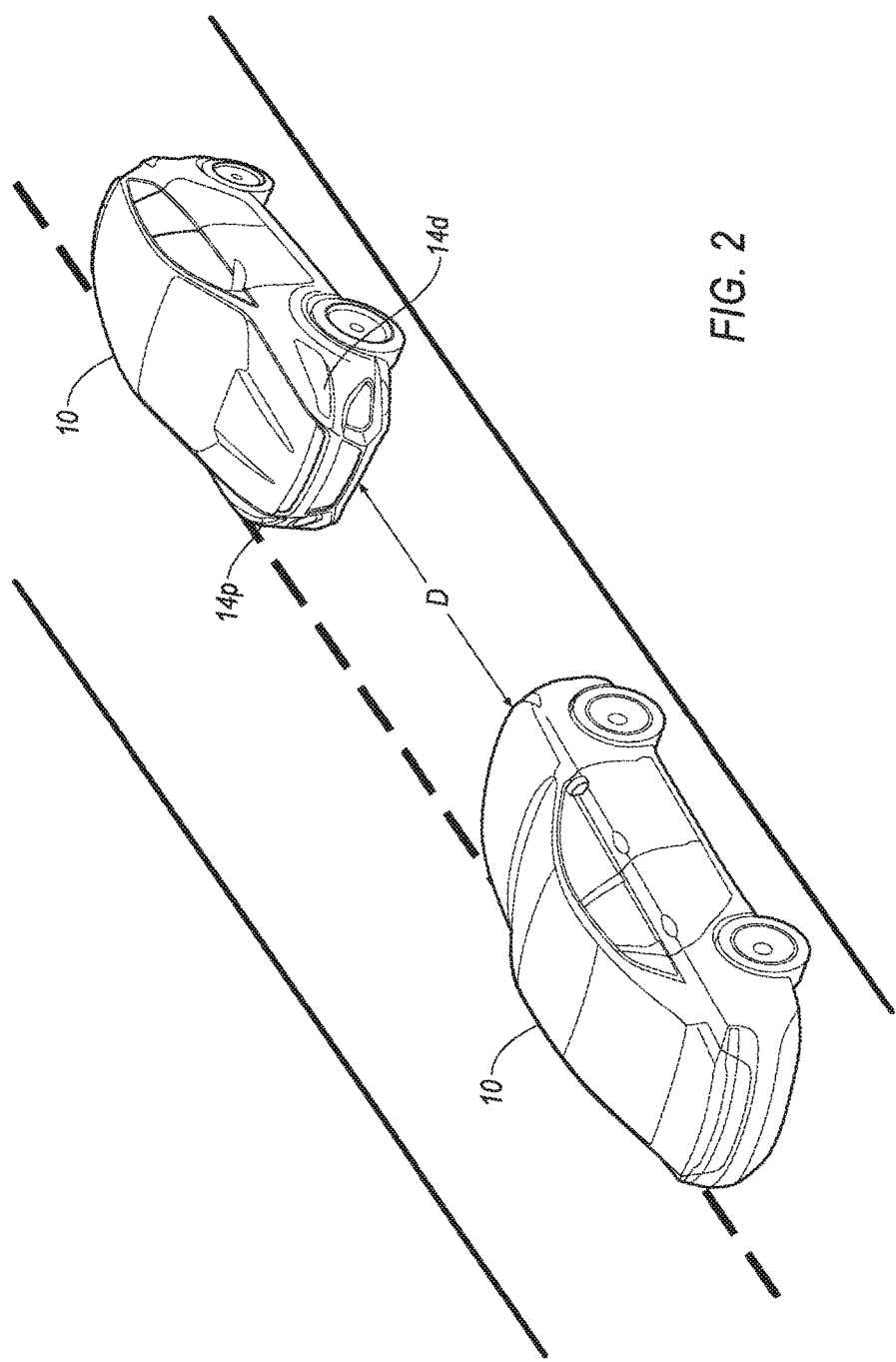
FIG. 2 a perspective view of the example vehicle traveling in a wrong-way direction.

The computer 12 may determine the first brightness level and/or the second brightness level based on a distance D between the vehicle 10 and another vehicle 10 (see FIG. 2). The distance D between the vehicle 10 and another vehicle 10 may be determined by the computer 12 based on information received from the sensors 30, e.g., information received from radar sensors, scanning laser range finders, light detection and ranging (LIDAR) devices, etc. The determined distance D between the vehicle 10 and another vehicle 10 may be used by the computer 12 in combination with a look up table correlating various distances with various first and/or second brightness levels, e.g., where greater distances correlate with a greater variation between first and second brightness levels, a higher brightness level for the first and/or second brightness levels, etc. The look up table may be stored locally and/or remotely, e.g., in the vehicle computer 12 and/or in the server computer 18.

The computer 12 may actuate the light 14 between an on state and an off state to provide the user-detectable pattern. The on state is where the light 14 produces a sufficient amount of light to be detected by the person external of the vehicle 10, e.g., 700 lumen, at a threshold distance, e.g., 100 yards. The off state is where the light 14 provides substantially no user-detectable light.

The computer 12 may actuate the light 14 to provide the user-detectable pattern at a rate based on a speed of the vehicle 10. The rate of the user-detectable pattern is a frequently at which the light 14 is actuated, e.g., between the first and second brightness levels and/or the on and off states. The speed of the vehicle 10 may be determined by the computer 12 based on information from the sensors 30, e.g., information from wheel speed sensors. The determined speed may be used by the computer 12 in combination with a look up table or the like, e.g., stored locally in the computer 12 memory and/or remotely, correlating various speeds with various actuation rates, e.g., where higher speeds are correlated with higher frequency rates of actuation. The computer 12 may limit a maximum rate of actuation of the light 14, e.g., limiting actuation between the first and second brightness levels and/or the on and off states to not exceed a frequency determined to be viewed by a human as being steady-state light, e.g., 60 hertz.

The computer 12 may actuate a specific light 14 of the vehicle 10, such as one and only one of the driver side headlight 14*d* and the passenger side headlight 14*p* to provide the user-detectable pattern. Determination of which light 14 to actuate may be based on information received from the navigation system 26, e.g., to actuate the light 14 closest to an adjacent lane of travel.

The computer 12 may actuate the light 14 to provide the user-detectable pattern upon determination that a location of the vehicle 10 is a restricted location. As used herein "restricted location" is a geographical area designated as such. For example, various defined geographical areas and associated restricted designations may be stored in the navigation system 26, the computer 12, the server computer 18, etc., e.g., as part of the virtual map. The geographic area designated as the restricted location may be determined by a manufacturer of the vehicle 10, e.g., included in the virtual map stored in the navigation system 26, e.g., defined by private property boundaries, governmental restricted locations, locations not on a road, etc., and/or may be determined by a user of the vehicle 10, e.g., based on an input to the user interface 28, the user device 16, etc., and communicated with the computer 12, navigation system 26, server computer 18.

In addition to actuating the light 14, the computer 12 may limit the speed of the vehicle 10 upon the determination that the vehicle 10 is traveling in the wrong-way direction. To limit the speed the computer 12 may transmit a command, e.g., via the communication network 34, to the propulsion 22 instructing the propulsion 22 to limit output. Additionally or alternatively, the computer 12 may transmit a command to the brake system 24 to actuate to limit the speed of the vehicle 10. The amount the speed is limited, e.g., to a maximum speed of 25 miles per hour, may be determined by the manufacturer of the vehicle 10, e.g., stored in the computer 12. The amount the speed is limited may be determined based on a speed of oncoming traffic, e.g., other vehicles in the same lane as the vehicle 10 and traveling in the designated direction of travel. For example, the amount the speed is limited may be a percent of the speed of oncoming traffic, e.g., 50%. As another example, the amount by which the speed is limited may be identified with a lookup table or the like, e.g., stored in memory of the computer 12, including correlated oncoming traffic speeds with limits to the speed of the vehicle 10 traveling in the wrong-way direction. The computer 12 may determine the speed of oncoming traffic based on information received from sensors 30, e.g., a LIDAR device, and/or based on information from the navigation system 26, e.g., the speed limit included in the virtual map for the traveling lane of the wrong-way vehicle 10 may be identified as the speed of oncoming traffic.

The computer 12 may limit the speed of the vehicle 10 to a second amount upon determination that the vehicle 10 has traveled in the wrong-way direction for a threshold amount of time, e.g., 10 seconds. The speed may be limited as discussed above. The second amount, e.g., to a maximum speed of 15 miles per hour, may be lower than the speed to which the vehicle 10 was initially limited upon the determination that the vehicle 10 was traveling in the wrong-way direction. The second amount the speed is limited may be determined by the manufacturer of the vehicle 10, e.g., stored in the computer 12, and/or based on the speed of oncoming traffic, as described above. The threshold amount of time, e.g., 30 seconds, may be determined by the manufacturer of the vehicle 10, and/or based on the speed of oncoming traffic. For example, the threshold amount of time may be identified by the computer 12 with a lookup table or the like including, e.g., stored on the memory of the computer 12, correlated oncoming traffic speeds with threshold amounts of time.

Example Process

Figure 3:
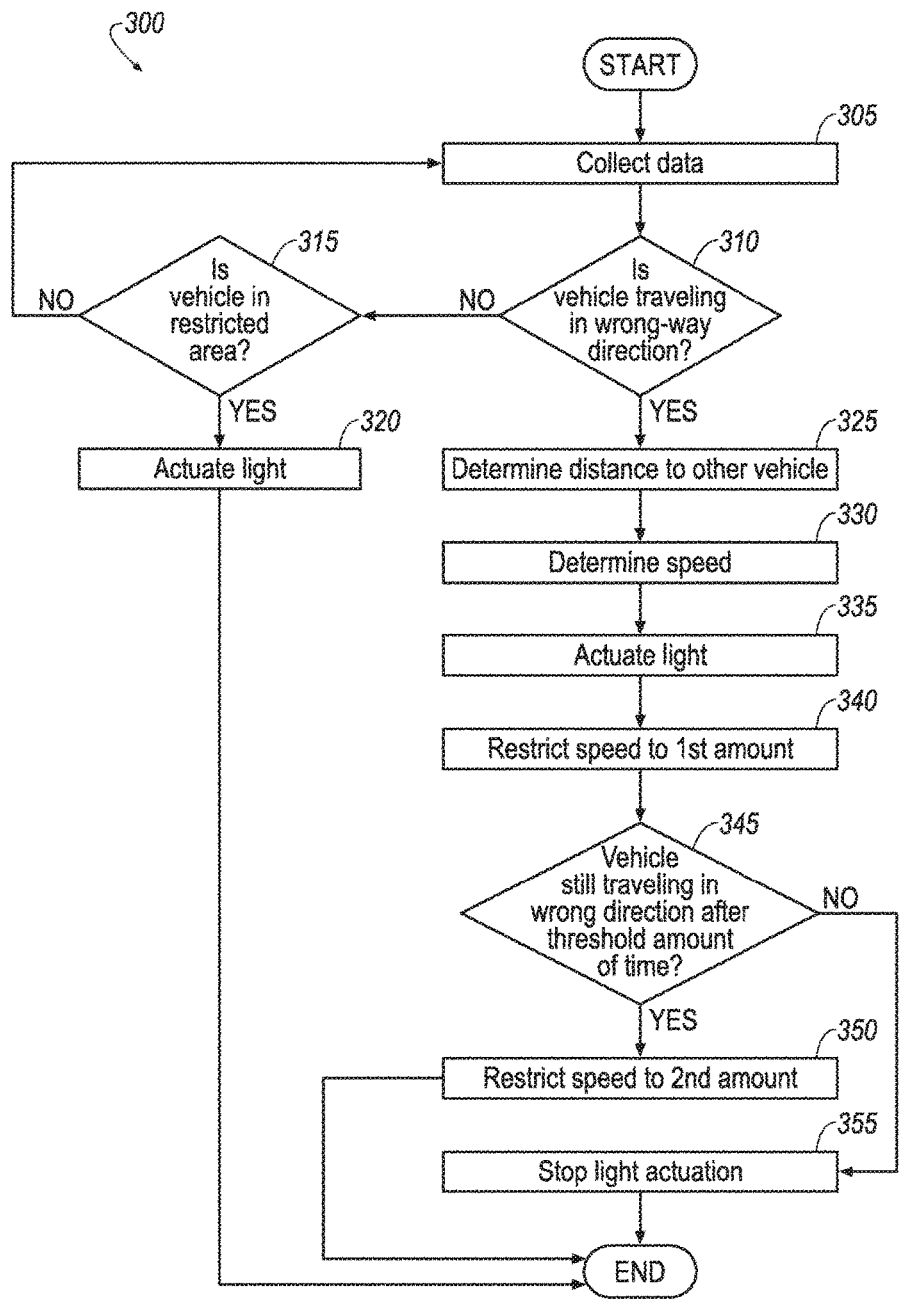
FIG. 3 is a process flow diagram of an exemplary process for the operating the vehicle wrong-way alert system of FIG. 1.

FIG. 3 is a process flow diagram illustrating an exemplary process 300 for operating the vehicle 10 to provide wrong-way detection. The process 300 begins in a block 305 when the vehicle 10 is powered on or otherwise placed in an operational state. Process 300 blocks may be executed by a processor of, according to programming stored in a memory of, the computer 12.

At the block 305 the computer 12 collects data and information from other vehicle components, e.g., the navigation system 26, the sensors 30, the transceiver 32, etc., via the communication network 34. The computer 12 may continue to collect data throughout the process 300, e.g., while the vehicle 10 is operational.

Next at a block 310 the computer 12 determines whether the vehicle 10 is traveling in a wrong-way direction, e.g., based on the information and data collected from the navigation system 26, the sensors 30, the transceiver 32, etc., as described herein. When the computer 12 determines the vehicle 10 is not traveling in the wrong-way direction the process 300 proceeds to a block 315. When the computer 12 determines the vehicle 10 is traveling in the wrong-way direction the process 300 proceeds to a block 325.

At the block 315 the computer 12 determines whether the vehicle 10 is in a restricted location, e.g., based on information received from the navigation system 26 via the communication network 34. When the computer 12 determines the vehicle 10 is in the restricted location, the process 300 proceeds to a block 320. When the computer 12 determines the vehicle 10 is not in the restricted location, the process 300 returns to the block 305.

At the block 320 the computer 12 actuates the light 14, e.g., by transmitting a command to the light 14 via the communication network 34. After the block 320 the process 300 ends. Alternatively, after the block 320 the process 300 may return to the block 305, continuing to run the process 300 until the vehicle 10 is powered off or otherwise placed in a non-operational state, or until the computer 12 is instructed to end the process 300, e.g., in response to user input to the user interface 28.

At the block 325 the computer 12 determines a distance to another vehicle 10, e.g., based on information received from the sensors 30, e.g., LIDAR, radar range sensors, etc., via the communication network 34.

At a block 330 the computer 12 determines a speed of the vehicle 10, e.g., based on information received from the sensors 30, e.g., a wheel speed sensor and/or the navigation system 26 via the communication network 34.

At a block 335 the computer 12 actuates the light 14, e.g., by transmitting a command to the light 14 via the communication network 34. The computer 12 may determine characteristics of the actuation, e.g., brightness levels, actuation frequency rates, etc., based at least on the distance to the other vehicle 10 and/or the vehicle 10 speed, as described herein.

At a block 340 the computer 12 limits the speed of the vehicle 10 to a first amount, e.g., by transmitting a command to the propulsion 22 and/or the brake system 24 via the communication network 34.

Next, at a block 345 the computer 12 determines whether the vehicle 10 is still traveling in the wrong-way direction after a threshold amount of time has lapsed, e.g., since the wrong-way determination in the block 310, since actuation of the light 14, or since restricting the speed of the vehicle 10 to the first amount. When the computer 12 determines the vehicle 10 is still traveling in the wrong-way direction the process 300 proceeds to a block 350. When the computer 12 determines the vehicle 10 is no longer traveling in the wrong-way direction the process 300 proceeds to a block 355.

At the block 350 the computer 12 limits the speed of the vehicle 10 to a second amount. After the block 350 the process 300 ends. Alternatively, after the block 350 the process 300 may return to the block 305, continuing to run the process 300 until the vehicle 10 is powered off or otherwise placed in a non-operational state, or until the computer 12 is instructed to end the process 300, e.g., in response to user input to the user interface 28.

At the block 355 the computer 12 stops actuation of the light 14, e.g., by transmitting a command to the light 14 via the communication network 34. After the block 355 the process 300 ends. Alternatively, after the block 355 the computer 12 may return to the block 305, continuing to run the process until the vehicle 10 is powered off or otherwise placed in a non-operational state, or until the computer 12 is instructed to end the process 300, e.g., in response to user input to the user interface 28.

Conclusion

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored in computer readable media associated therewith (e.g., disks, memories, etc.). A computer program product may comprise such instructions stored in computer readable media for carrying out the functions described herein.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising, a computer programmed to:
control actuation of a light of a first vehicle to provide a user-detectable pattern external to the first vehicle upon determination in the first vehicle that the first vehicle is traveling in a wrong-way direction, the determination in the first vehicle that the first vehicle is traveling in the wrong-way direction based on at least one of data from a navigation system of the first vehicle and data from a camera of the first vehicle.

2. The system of claim 1, wherein the computer is further programmed to actuate the light between a first brightness level and a second brightness level to provide the user-detectable pattern.

3. The system of claim 2, wherein the computer is further programmed to determine one of the first brightness level and the second brightness level based on a distance between the first vehicle and a second vehicle.

4. The system of claim 1, wherein the computer is further programmed to actuate the light between an on state and an off state to provide the user-detectable pattern.

5. The system of claim 1, wherein the computer is further programmed to actuate the light to provide the user-detectable pattern at a rate based on a speed of the first vehicle.

6. The system of claim 1, wherein the computer is further programmed to actuate the light to provide the user-detectable pattern at a rate that does not exceed 60 hertz.

7. The system of claim 1, wherein the computer is further programmed to actuate the light to provide the user-detectable pattern upon determination that a location of the first vehicle is a restricted location.

8. The system of claim 1, wherein the computer is further programmed to actuate one and only one of a driver side headlight and a passenger side headlight to provide the user-detectable pattern.

9. The system of claim 1, wherein the computer is further programmed to limit a speed of the first vehicle to a first amount upon the determination that the first vehicle is traveling in the wrong-way direction.

10. The system of claim 9, wherein the computer is further programmed to limit the speed of the first vehicle to a second amount upon determination that the first vehicle has traveled in the wrong-way direction for a threshold amount of time.

11. A method comprising:
controlling actuation of a light of a first vehicle to provide a user-detectable pattern external to the first vehicle upon determination in the first vehicle that the first vehicle is traveling in a wrong-way direction, the determination in the first vehicle that the first vehicle is traveling in the wrong-way direction based on at least one of data from a navigation system of the first vehicle and data from a camera of the first vehicle.

12. The method of claim 11, further comprising actuating the light between a first brightness level and a second brightness level to provide the user-detectable pattern.

13. The method of claim 12, further comprising determining one of the first brightness level and the second brightness level based on a distance between the first vehicle and a second vehicle.

14. The method of claim 11, further comprising actuating the light between an on state and an off state to provide the user-detectable pattern.

15. The method of claim 11 further comprising actuating the light to provide the user-detectable pattern at a rate based on a speed of the first vehicle.

16. The method of claim 11, further comprising actuating the light to provide the user-detectable pattern at a rate that does not exceed 60 hertz.

17. The method of claim 11, further comprising actuating the light to provide the user-detectable pattern upon determination that a location of the first vehicle is a restricted location.

18. The method of claim 11, further comprising actuating one and only one of a driver side headlight and a passenger side headlight to provide the user-detectable pattern.

19. The method of claim 11, further comprising limiting a speed of the first vehicle to a first amount upon the determination that the first vehicle is traveling in the wrong-way direction.

20. The method of claim 19, further comprising limiting the speed of the first vehicle to a second amount upon determination that the first vehicle has traveled in the wrong-way direction for a threshold amount of time.

\* \* \* \* \*